| US 9,221,133 B2 |
| --- |

(12) United States Patent
Lee et al.

(10) Patent No.: US 9,221,133 B2
(45) Date of Patent: Dec. 29, 2015

(54) WELDING DEVICE FOR STRETCH BENDER

(75) Inventors: Mun Yong Lee, Busan (KR); Kuk-Rae Cho, Busan (KR)

(73) Assignee: SUNGWOO HITECH CO., LTD., Busan (KR)

( * ) Notice: Subject to any disclaimer, the term of this patent is extended or adjusted under 35 U.S.C. 154(b) by 856 days.

(21) Appl. No.: 13/491,266

(22) Filed: Jun. 7, 2012

(65) Prior Publication Data

US 2012/0312794 A1 Dec. 13, 2012

(30) Foreign Application Priority Data

Jun. 10, 2011 (KR) .................. 10-2011-0056490

(51) Int. Cl.
| | |
|---|---|
| *B23K 15/00* | (2006.01) |
| *B23K 9/00* | (2006.01) |
| *B23K 37/00* | (2006.01) |
| *B23K 37/04* | (2006.01) |
| *B21D 11/02* | (2006.01) |
| *B23K 11/11* | (2006.01) |
| *B23K 37/02* | (2006.01) |
| *B23K 26/26* | (2014.01) |
| *B23K 31/02* | (2006.01) |

(52) U.S. Cl.
CPC ............ *B23K 37/0443* (2013.01); *B21D 11/02* (2013.01); *B23K 11/115* (2013.01); *B23K 26/26* (2013.01); *B23K 31/022* (2013.01); *B23K 37/02* (2013.01); *B23K 2201/28* (2013.01)

(58) Field of Classification Search
CPC ........ B21D 11/02; B21D 25/00; B21D 25/02; B21D 25/04; B23K 11/115; B23K 2201/28; B23K 26/26; B23K 31/022

USPC .......... 219/127, 121.11–121.14; 72/294–297, 72/306; 228/15.1
See application file for complete search history.

(56) References Cited

U.S. PATENT DOCUMENTS

2002/0100308 A1* 8/2002 Wegener .................... 72/295

FOREIGN PATENT DOCUMENTS

| | | | |
|---|---|---|---|
| CN | 1100354 | 3/1995 | |
| CN | 1340390 | 3/2002 | |
| JP | 07-024533 | 1/1995 | |
| KR | 10-0809372 | 2/2008 | |
| KR | 100809372 B1 * | 3/2008 | ............ B22D 46/00 |
| KR | 10-2009-0053077 | 5/2009 | |
| KR | 1020090070811 | 7/2009 | |
| KR | 10-2011-0007595 | 1/2011 | |

OTHER PUBLICATIONS

Chinese Patent Office, Search Report dated Jan. 16, 2014, which was attached to the Office Action dated Mar. 17, 2014, of the corresponding Chinese Patent Application No. 201210189100.4.

* cited by examiner

*Primary Examiner* — Tu B Hoang
*Assistant Examiner* — Michael Hoang
(74) *Attorney, Agent, or Firm* — Lex IP Meister, PLLC (57) ABSTRACT

A welding device for a stretch bender is disclosed. The welding device for the stretch bender may include: an operating unit adapted to move forward toward or rearward from a bending die for shaping a shaped beam and mounted in front of the bending die; and a welding unit mounted at the operating unit and welding flange portions of the shaped beam that is completely formed by the bending die so as to prevent the flange portions from being overlapped with each other when extracting the shaped beam, the welding unit being movable forward or rearward against the operating unit.

11 Claims, 8 Drawing Sheets

FIG. 8

# WELDING DEVICE FOR STRETCH BENDER

CROSS-REFERENCE TO RELATED APPLICATION

This application claims priority to and the benefit of Korean Patent Application No. 10-2011-0056490 filed in the Korean Intellectual Property Office on Jun. 10, 2011, the entire contents of which are incorporated herein by reference.

BACKGROUND OF THE INVENTION (a) Field of the Invention

The present invention relates to a welding device for a stretch bender. More particularly, the present invention relates to a welding device for a stretch bender that welds flange portions of a shaped beam before extracting the shaped beam on which stretch bend forming is completely performed such that the flange portions are prevented from being overlapped with each other when extracting the shaped beam.

(b) Description of the Related Art

Generally, a bending machine forms a beam to have a curvature. Particularly, the bending machine is adapted to bend a straight shaped beam to have a predetermined curvature formed by roll forming so as to manufacture a bumper beam for vehicles.

Figure 1:
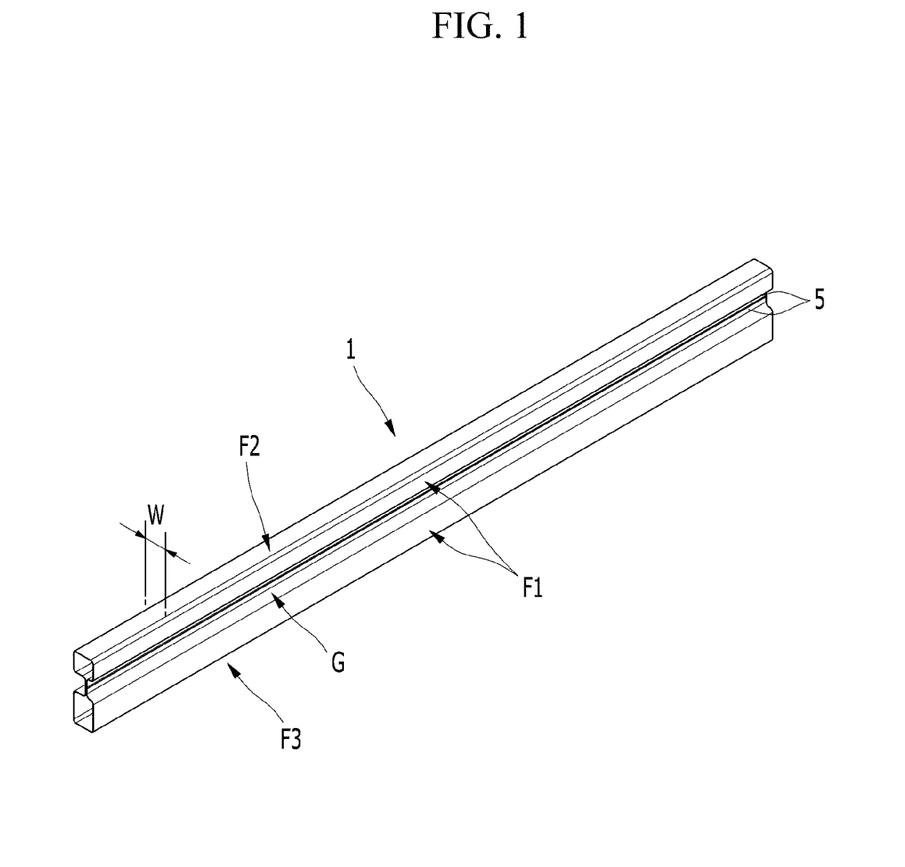
FIG. 1 is a perspective view of a straight shaped beam formed through roll forming process.
Figure 2:
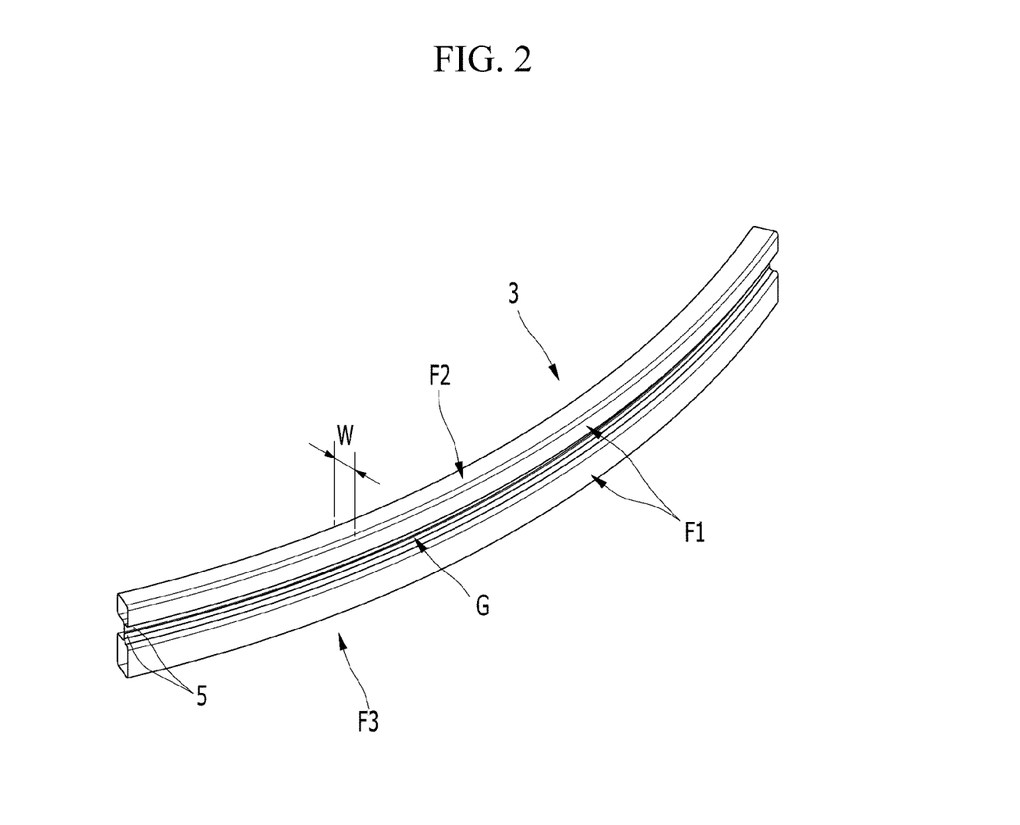
FIG. 2 is a perspective view of a curved shaped beam bended by using a bending machine.

The bending machine bends a straight beam 1 illustrated in FIG. 1 so as to manufacture a curved shaped beam 3 having a predetermined curvature illustrated in FIG. 2.

Herein, the straight beam 1 includes a front surface F1, an upper surface F2 and a lower surface F3, and a groove portion G is formed at a center portion of the front surface F1. In addition, flange portions 5 are positioned respectively at an upper portion and a lower portion of the groove portion G. The straight beam 1 illustrated in FIG. 1 has a width W relatively wider than that of a bumper beam used in a car, and can be used as the bumper beam of a large truck.

However, if a high strength straight beam 1 having relatively wider widths of the upper surface F2 and the lower surface F3 is bent using a typical roll bender or a typical round bender, formability may be deteriorated due to high strength of the straight beam 1.

In addition, if the straight beam 1 is made of high strength material, precise curvature cannot be formed due to spring back, and dimension error and bad assembly may occur.

To solve such drawbacks, a stretch bender is used. The stretch bender pulls both ends of the high strength shaped beam having relatively wider width to the both sides and performs stretch bend forming on the shaped beam against a bending die having a predetermined shape. Therefore, strength and spring back of the shaped beam can be controlled and dimensional accuracy of the curvature may be enhanced.

Figure 3:
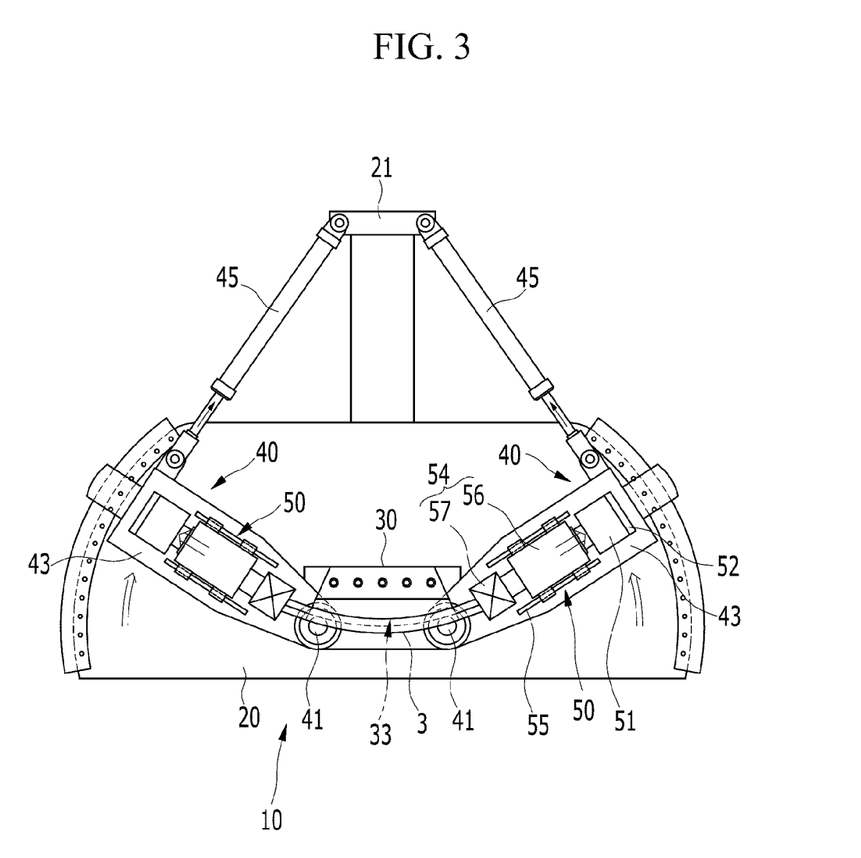
FIG. 3 is a top plan view of a typical stretch bender.

Referring to FIG. 3, the stretch bender 10 includes a bender base 20, a bending die 30, a rotating unit 40 and a stretching unit 50.

A hinge frame 21 is mounted at a rear portion of a middle portion of the bender base 20.

The bending die 30 is mounted at a center portion of an upper surface of the bender base 20 so as to bend the straight beam 1 to have the predetermined curvature.

A curvature forming groove 33 having the predetermined curvature is formed at a front surface of the bending die 30.

In addition, a pair of rotating units 40 is mounted at both sides of the upper surface of the bender base 20. A pair of rotating shafts 41 is mounted at the bender base 20 corresponding to both side portions of the bending die 30, and a rotating table 43 of each rotating unit 40 is adapted to be rotated about the rotating shaft 41 by operation of a cylinder.

The rotating table 43 receives rotating torque from a rotating cylinder 45, and the rotating cylinder 45 is mounted between the hinge frame 21 and the rotating table 43.

In addition, the stretching unit 50 is mounted on the rotating table 43 of each rotating unit 40. The stretching unit 50 clamps both end portions of the shaped beam 1 and pulls the both end portions of the shaped beam 1 with a predetermined pressure so as to perform stretching operation.

That is, stretching unit 50 includes a stretching cylinder 51 mounted on one side portion of the rotating table 43 and a toggle clamper 54 provided at a front end of an operating rod of the stretching cylinder 51. The toggle clamper 54 is slidably mounted along a guide rail 55 mounted on the rotating table 43.

Herein, the toggle clamper 54 includes a clamping cylinder unit 56 and a clamping member 57. The clamping cylinder unit 56 operates the clamping member 57 such that the clamping member 57 clamp an end portion of the shaped beam 1 so as to maintain stretching operation by the stretching cylinder 51.

Therefore, if the straight beam 1 is supplied in front of the bending die 30, the stretching cylinder 51 moves forward and the toggle clampers 54 clamp both end portions of the straight beam 1.

At this state, if the rotating cylinder 45 moves rearward so as to pull an end portion of the rotating table 43 rearward, the rotating table 43 rotates about the rotating shaft 41. At the same time, the stretching cylinder 51 moves rearward so as to move the toggle clamper 54 rearward. Therefore, the toggle clampers 54 pulls the both end portions of the straight beam 1 so as to stretch the straight beam 1.

Therefore, the straight beam 1 is stretched and bent by the bending die 30 such that the shaped beam 3 having the predetermined curvature is formed.

According to a conventional stretch bender, however, the straight beam 1 is fitted in the curvature forming groove 33 of the bending die 30 after the straight beam 1 is formed to be the shaped beam 3 having the predetermined curvature along the curvature forming groove 33 of the bending die 30. It is difficult for a worker to extract the shaped beam 3 for himself, and the flange portions 5 positioned in the groove portion G may be overlapped with each other by force exerted when extracting the shaped beam 3.

If the flange portions 5 of the shaped beam 3 are overlapped with each other, working efficiency and welding quality may be deteriorated and accordingly, marketability may be also deteriorated at spot welding or laser welding that is a next process.

In addition, since additional device or apparatus for disposing the flange portions 5 of the shaped beam 3 at their home positions are necessary so as to prevent such problems, investment cost may be increased and productivity may be deteriorated due to extended manufacturing cycle time.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a welding device for a stretch bender having advantages of automatically welding flange portions of a shaped beam before extracting the shaped beam of which stretch bending forming is completely performed such that the flange portions are prevented from being overlapped with each other when extracting the shaped beam.

Another embodiment of the present invention provides a welding device for a stretch bender having further advantages of reducing investment cost by removing additional devices for positioning the flange portions at their home positions and improving productivity and welding quality as a consequence of preventing the flange portions of the shaped beam from being overlapped with each other.

A welding device for a stretch bender according to an exemplary embodiment of the present invention may include: an operating unit adapted to move forward toward or rearward from a bending die for shaping a shaped beam and mounted in front of the bending die; and a welding unit mounted at the operating unit and welding flange portions of the shaped beam that is completely formed by the bending die so as to prevent the flange portions from being overlapped with each other when extracting the shaped beam, the welding unit being movable forward or rearward against the operating unit.

The operating unit may include: a mounting frame disposed in front of the bending die; a first hinge block disposed at a side of the mounting frame; a second hinge block disposed apart from the first hinge block toward the bending die; a pair of first connecting links having ends hinged respectively to the first hinge block and the second hinge block; a movable frame having a rear end and a middle portion respectively hinged to the other ends of the pair of the first connecting links; and a first operating cylinder having an operating rod, a rear end of the first operating cylinder being hinged to an upper portion of the mounting frame and a front end of the operating rod being hinged to a front end portion of the movable frame.

An upper end of the mounting frame may be positioned higher than a highest position of the other ends of the pair of the first connecting links respectively hinged to the first and second hinge blocks.

The pair of the first connecting links may move the movable frame forward or rearward by being rotated with respect to the first and second hinge blocks according to forward or rearward movement of the first operating cylinder.

The first operating cylinder may be a hydraulic cylinder.

The first operating cylinder may be a pneumatic cylinder.

The welding unit may include: a fixed frame mounted at a front end portion of the movable frame; a second connecting link, one end of the second connecting link being hinged to a front portion of the fixed frame; a third connecting link disposed apart from the second connecting link toward the bending die, a middle portion of the third connecting link being hinged to a front end portion of the fixed frame; a second operating cylinder having an operating rod, a rear end of the second operating cylinder being hinged to an upper portion of the rear end of the fixed frame and a front end of the operating rod being hinged to one end of the third connecting link; a connecting block hinged to the other ends of the second connecting link and the third connecting link; and a welder mounted at the connecting block so as to face the bending die.

The third connecting link may be longer than the second connecting link such that one end portion of the third connecting link is protruded upwardly from the fixed frame, the middle portion of the third connecting link is hinged to the front end portion of the fixed frame, and the one end of the third connecting link is protruded upwardly from the fixed frame so as to be hinged to the front end of the operating rod of the second operating cylinder.

The second and third connecting links may be rotated with respect to the fixed frame so as to move the connecting block rearward or forward when the second operating cylinder moves forward or rearward.

The welder may be mounted so as to be protruded toward the bending die through a mounting block mounted downwardly at the front end portion of the connecting block.

The welder may be a one-side arc spot welder.

The second operating cylinder may be a hydraulic cylinder.

The second operating cylinder may be a pneumatic cylinder.

DESCRIPTION OF SYMBOLS

| | |
|---|---|
| 100: welding device for stretch bender | |
| 103: die frame | 110: operating unit |
| 111: mounting frame | 113: first hinge block |
| 115: second hinge block | 117: first connecting link |
| 119: movable frame | 121: first operating cylinder |
| 130: welding unit | 131: fixed frame |
| 133: second connecting link | 135: third connecting link |
| 137: connecting block | 139: second operating cylinder |
| 143: welder | 145: mounting block |

DETAILED DESCRIPTION OF THE EMBODIMENTS

An exemplary embodiment of the present invention will hereinafter be described in detail with reference to the accompanying drawings.

Exemplary embodiments and drawings disclosed in this specification represent only a few exemplary embodiments of the present invention and do not represent all the spirit of the present invention. So, it is to be understood that various equivalents and variation can exist at the filing date of the present application.

Components that are not directly related to the present invention will be omitted in order to describe the present invention clearly, and the same or similar reference numerals are used for the same or similar constituent elements in the specification.

In addition, size and thickness of components shown in the drawings may be differ from real size and real thickness of the components for better comprehension and ease of description. Therefore, the present invention is not limited to those shown in the drawings.

Figure 4:
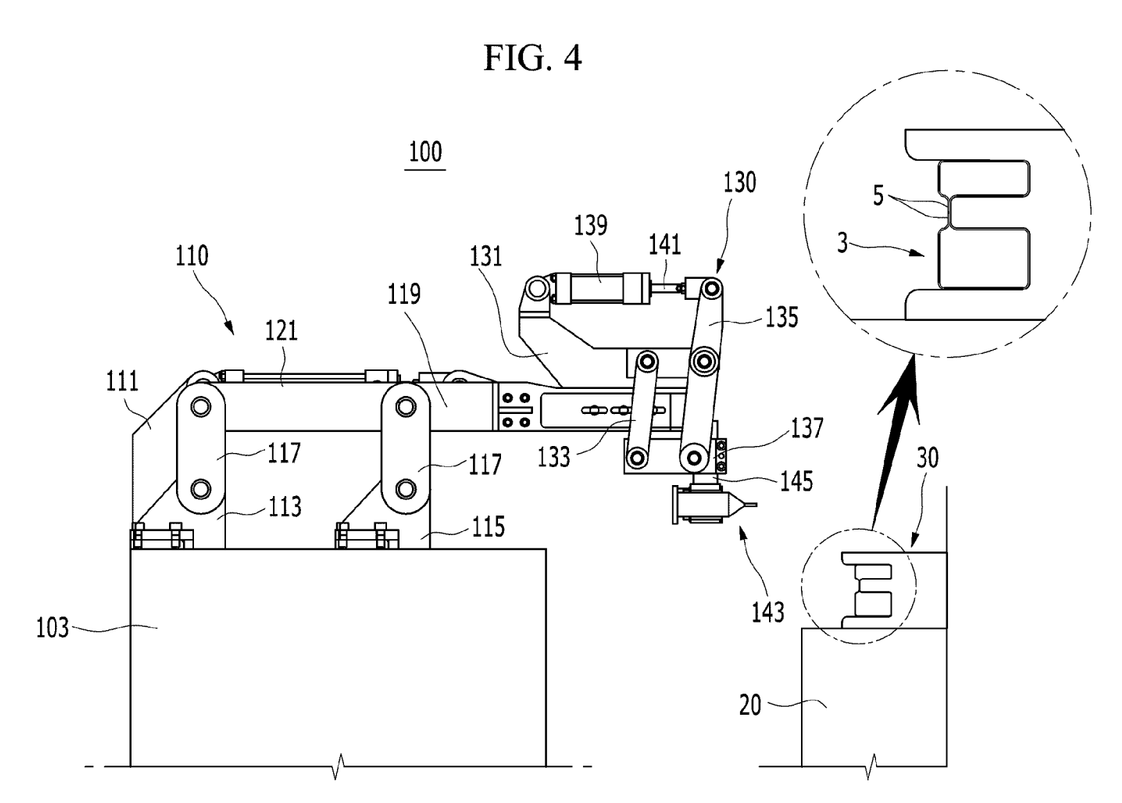
FIG. 4 is a side view of a welding device for a stretch bender according to an exemplary embodiment of the present invention.

FIG. 4 is a side view of a welding device for a stretch bender according to an exemplary embodiment of the present invention.

Referring to the drawing, a welding device 100 for a stretch bender according to an exemplary embodiment of the present invention is mounted corresponding to a bending die 30 mounted on a bender base 20.

The welding device 100 for the stretch bender according to an exemplary embodiment of the present invention includes a simple link structure driven by driving torque of a cylinder and is adapted to automatically weld flange portions 5 of a shaped beam 3 before extracting the shaped beam 3 on which stretch bend forming is completely performed. Therefore, the flange portions 5 of the shaped beam 3 may be prevented from being overlapped with each other when extracting the shaped beam 5 and marketability may be improves.

In addition, since the flange portions 5 of the shaped beam 3 are prevented from being overlapped with each other, investment cost may be reduced by removing additional devices for positioning the flange portions 5 overlapped with each other at their home positions at spot welding or laser welding that is a next process. Further, productivity may be improved by reducing manufacturing cycle time and welding quality may be also improved.

For these purposes, the welding device 100 for the stretch bender according to an exemplary embodiment of the present invention, as shown in FIG. 4, includes an operating unit 110 and a welding unit 130, and the operating unit 110 and the welding unit 130 will be described in detail.

The operating unit 110 is adapted to move forward toward or rearward from the bending die 30 for shaping the shaped beam 3 by driving torque of a cylinder and is mounted in front of the bending die 30.

The operating unit 110 includes a mounting frame 111, a first hinge block 113, a second hinge block 115, a first connecting link 117, a movable frame 119 and a first operating cylinder 121, and each component will be described in detail.

According to the present exemplary embodiment, the mounting frame 111 is mounted on an upper surface of a die frame 103 disposed in front of the bending die 30.

The first hinge block 113 is mounted at a side of the mounting frame 111 on the upper surface of the die frame 103, and the second hinge block 115 is disposed apart from the first hinge block 113 toward the bending die 30 and is mounted on the upper surface of the die frame 103.

That is, the first hinge block 113 is mounted apart from the mounting frame 111 in a side direction, and the second hinge block 115 is mounted apart from the first hinge block 113 toward the bending die 30 by a predetermined distance on the die frame 103.

According to the present exemplary embodiment, ends of the pair of the first connecting links 117 are respectively hinged to the first hinge block 113 and the second hinge block 115.

An upper end of the mounting frame 111 is positioned higher than a highest position of the other ends of the pair of the first connecting links 117 respectively hinged to the first and second hinge blocks 113 and 115.

According to the present exemplary embodiment, the other ends of the pair of the first connecting links 117 are respectively hinged to a rear end and a middle portion of the movable frame 119.

In addition, a rear end of the first operating cylinder 119 is hinged to an upper portion of the mounting frame 111, and a front end of an operating rod 123 of the first operating cylinder 119 is hinged to a side portion of a front end portion of the movable frame 119.

If the operating rod 123 of the first operating cylinder 121 moves forward, each first connecting link 117 rotates with respect to each of the first and second hinge blocks 113 and 115 toward the bending die 30.

If the operating rod 123, on the contrary, moves rearward, each first connecting link 117 rotates with respect to each of the first and second hinge blocks 113 and 115 and returns to an initial position.

If the first connecting links 117 rotate with respect to the first and second hinge blocks 113 and 115, the movable frame 119 moves forward or rearward.

The first operating cylinder 121 may be a hydraulic cylinder operated by hydraulic pressure or a pneumatic cylinder operated by pneumatic pressure.

In one or more exemplary embodiments, the pair of movable frames 119 is provided. In this case, a pair of the first and second hinge blocks 113 and 115 and two pairs of the first connecting links 117 are provided so as to move the movable frame 119 forward or rearward.

In addition, the welding unit 130 is mounted at a front end of the movable frame 119 of the operating unit 110 and is movable forward or rearward against the operating unit 110 by driving torque of a cylinder. The welding unit 130 is adapted to weld the flange portions 5 of the shaped beam 3 that is completely formed by the bending die 30. Therefore, the flange portions 5 are prevented from being overlapped with each other when extracting the shaped beam 3.

The welding unit 130 includes a fixed frame 131, a second connecting link 133, a third connecting link 135, a connecting block 137, a second operating cylinder 139 and a welder 143.

The fixed frame 131 is mounted at a front end portion of the movable frame 119.

An end of the second connecting link 133 is hinged to a front portion of the fixed frame 119, the third connecting link 135 is disposed apart from the second connecting link 133 toward the bending die 30, and a middle portion of the third connecting link 135 is hinged to a front end portion of the fixed frame 131.

A rear end of the second operating cylinder 139 is hinged to an upper portion of the rear end of the fixed frame 131, and a front end of an operating rod 141 of the second operating cylinder 139 is hinged to an end of the third connecting link 135.

The third connecting link 135 is longer than the second connecting link 133 such that an end portion of the third connecting link 135 is protruded upwardly from the fixed frame 131. The middle portion of the third connecting link 135 is hinged to the front end portion of the fixed frame 131 and the end of the third connecting link 135 is protruded upwardly from the fixed frame 131 so as to be hinged to the front end of the operating rod 141 of the second operating cylinder 139.

The connecting block 137 is hinged to the other ends of the second connecting link 133 and the third connecting link 135.

According to the present exemplary embodiment, if the operating rod 141 of the second operating cylinder 139 moves forward or rearward, the second and third connecting links 133 and 135 are rotated with respect to the fixed frame 131 so as to move the connecting block 137 rearward or forward.

The second operating cylinder 139 may be a hydraulic cylinder operated by hydraulic pressure or a pneumatic cylinder operated by pneumatic pressure.

In addition, the welder 143 is mounted at the connecting block 137 so as to face to the bending die 30.

That is, the welder 143 is mounted so as to be protruded toward the bending die 30 through a mounting block 145 mounted downwardly at the front end portion of the connecting block 137.

The welder 143 may be a one-side arc spot welder.

In one or more exemplary embodiments, a pair of welder 143 may be provided in front of the shaped beam 3 corresponding to both side portions of the shaped beam 3. In this case, a pair of second and third connecting links 133 and 135 and a pair of connecting blocks 137 may be provided corresponding to the pair of welders 143.

That is, both side portions of the flange portions 5 of the shaped beam 3 may be simultaneously welded by providing two welders 143.

In one or more exemplary embodiments, the number of the welders 143 can be changed, and the number of welding points of the flange portions 5 which can be simultaneously welded through one welding process may be changed according to the number of the welders 143.

Operation of the welding device for the stretch bender according to an exemplary embodiment of the present invention will be described in detail.

FIG. 5 to FIG. 8 are side views for illustrating operating of a welding device for a stretch bender according to an exemplary embodiment of the present invention.

After a straight beam 1 is inserted in the bending die 30 of the stretch bender 10, the shaped beam 3 having a predetermined curvature is completely formed through stretch bend forming.

Figure 5:
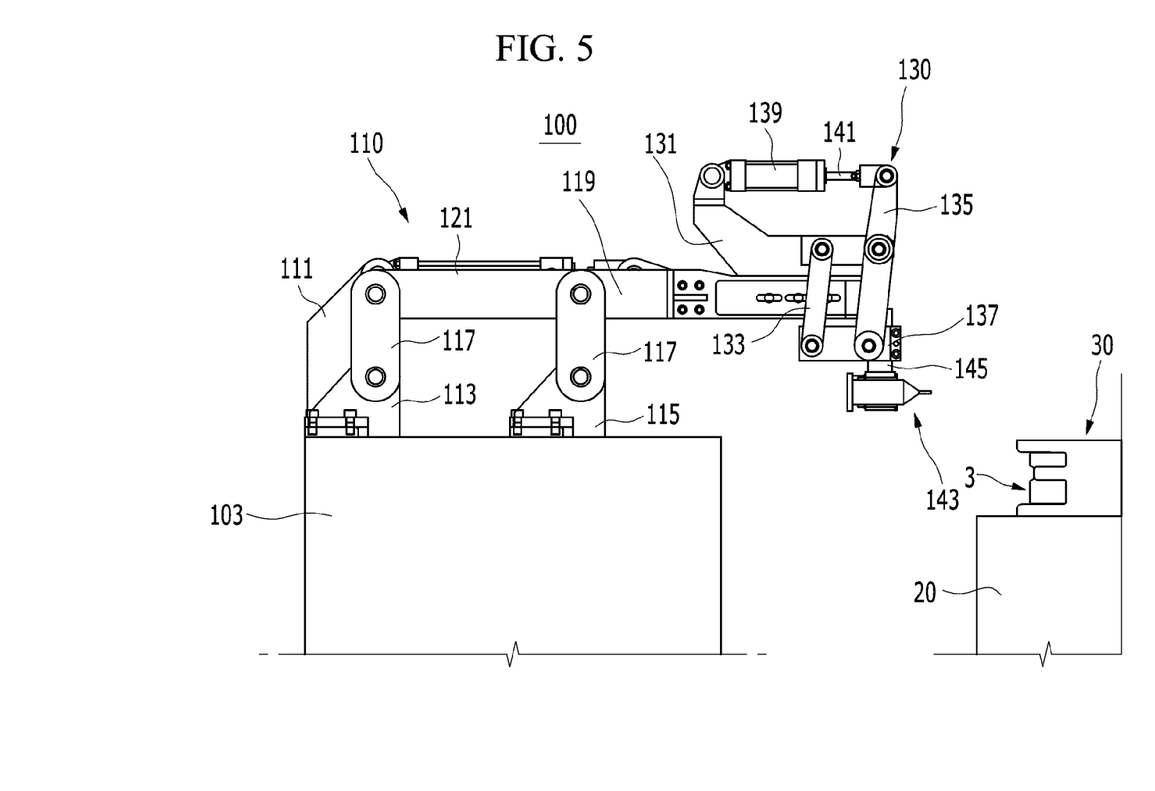
FIG. 5 to FIG. 8 are side views for illustrating operating of a welding device for a stretch bender according to an exemplary embodiment of the present invention.

In this case, as shown in FIG. 5, each first connecting link 117 is vertically disposed and maintains its initial position. At this time, the operating rod 123 of the first operating cylinder 121 is at a rearward position.

In addition, an operating rod 141 of the second operating cylinder 139 is at a forward position such that the welder 143 is at a rearward position, and the other ends of the second and third connecting links 133 and 135 are at a state of being rotated rearward with respect to the fixed frame 131.

Figure 6:
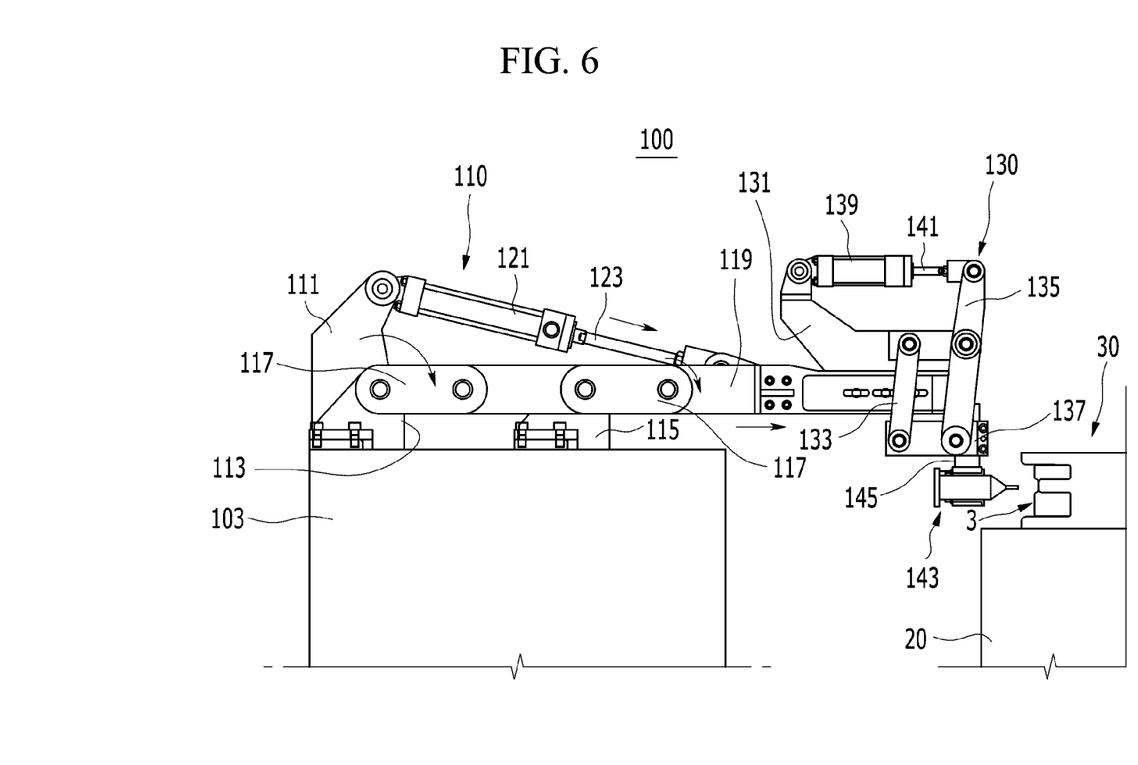

If the operating rod 123 of the first operating cylinder 121 moves forward at this state, as shown in FIG. 6, the first connecting links 117 rotate toward the bending die 30 respectively with respect to the first and second hinge blocks 113 and 115. In this case, the movable frame 119 moves forward toward the bending die 30 by rotation of the first connecting links 117.

Therefore, the welder 143 is disposed at a position corresponding to the flange portions 5 of the shaped beam 3.

Figure 7:
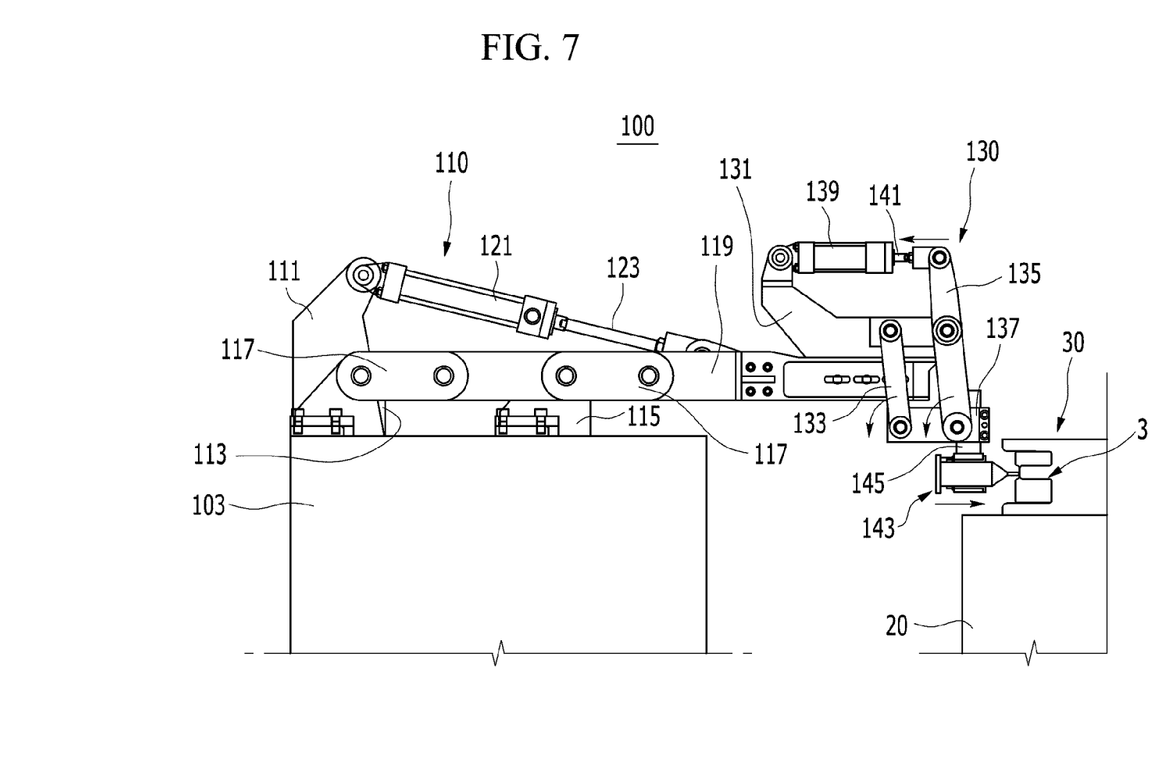

If the movable frame 119 fully moves forward by operation of the first operating cylinder 121 of the operating unit 110, as shown in FIG. 7, the second operating cylinder 139 of the welding unit 130 is operated so as to move the operating rod 141 of the second operating cylinder 139 rearward.

Then, the other ends of the second and third connecting links 133 and 135 connected to the connecting block 137 are rotated toward the bending die 30 with respect to the fixed frame 131. Therefore, the welder 143 contacts with the flange portions 5 of the shaped beam 3 and welds the flange portions 5.

Figure 8:
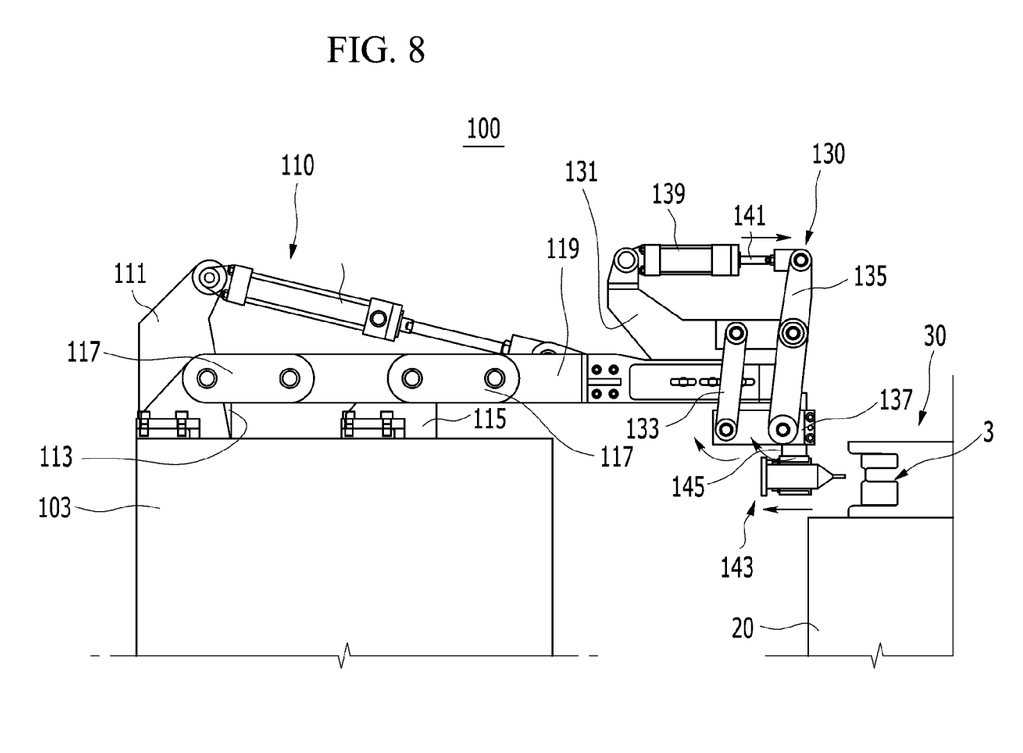

If the flange portions 5 of the shaped beam 3 are welded completely, as shown in FIG. 8, the operating rod 141 of the second operating cylinder 139 moves forward.

In this case, the other ends of the second and third connecting links 133 and 135 are rotated rearward with respect to the fixed frame 131, as shown in FIG. 6, the welder 143 is separated from the shaped beam 3 by a predetermined distance.

At this state, the operating rod 123 of the first operating cylinder 121 moves rearward and the other ends of the first connecting links 117 are rotated upwardly with respect to the first and second hinge blocks 113 and 115. Therefore, the welding device 100 according to an exemplary embodiment of the present invention returns to its initial position as shown in FIG. 5.

After that, the shaped beam 3, the flange portions 5 of which are welded completely, is extracted from the bending die 30.

That is, the welding device 100 for the stretch bender according to an exemplary embodiment of the present invention repeats aforementioned processes so as to weld the flange portions 5 of the shaped beam 3 by using the operating unit 110 and the welding unit 130.

The welding device 100 for the stretch bender according to an exemplary embodiment of the present invention includes a simple link structure driven by driving torque of a cylinder and is adapted to automatically weld the flange portions 5 of the shaped beam 3 before extracting the shaped beam 3 on which stretch bend forming is completely performed. Therefore, the flange portions 5 of the shaped beam 3 may be prevented from being overlapped with each other when extracting the shaped beam 5 and marketability may be improves.

In addition, since the flange portions 5 of the shaped beam 3 are prevented from being overlapped with each other, investment cost may be reduced by removing additional devices for positioning the flange portions 5 overlapped with each other at their home positions at spot welding or laser welding that is a next process.

Further, productivity may be improved by reducing manufacturing cycle time and welding quality may be also improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A welding device for a stretch bender, comprising:
    an operating unit adapted to move forward toward or rearward from a bending die for shaping a shaped beam and mounted in front of the bending die; and
    a welding unit mounted at the operating unit and welding flange portions of the shaped beam that is completely formed by the bending die so as to prevent the flange portions from being overlapped with each other when extracting the shaped beam, the welding unit being movable forward or rearward against the operating unit,
    wherein the operating unit comprises:
    a mounting frame disposed in front of the bending die;
    a first hinge block disposed at a side of the mounting frame;
    a second hinge block disposed apart from the first hinge block toward the bending die;
    a pair of first connecting links having ends hinged respectively to the first hinge block and the second hinge block;
    a movable frame having a rear end and a middle portion respectively hinged to other ends of the pair of the first connecting links; and
    a first operating cylinder having an operating rod, a rear end of the first operating cylinder being hinged to an upper portion of the mounting frame and a front end of the operating rod being hinged to a front end portion of the movable frame, and
    wherein the welding unit comprises:
    a fixed frame mounted at a front end portion of the movable frame;
    a second connecting link, one end of the second connecting link being hinged to a front portion of the fixed frame;

a third connecting link disposed apart from the second connecting link toward the bending die, a middle portion of the third connecting link being hinged to a front end portion of the fixed frame;

a second operating cylinder having an operating rod, a rear end of the second operating cylinder being hinged to an upper portion of the rear end of the fixed frame and a front end of the operating rod being hinged to one end of the third connecting link;

a connecting block hinged to the other ends of the second connecting link and the third connecting link; and a welder mounted at the connecting block so as to face the bending die.

2. The welding device of claim 1, wherein an upper end of the mounting frame is positioned higher than a highest position of the other ends of the pair of the first connecting links respectively hinged to the first and second hinge blocks.

3. The welding device of claim 1, wherein the pair of the first connecting links moves the movable frame forward or rearward by being rotated with respect to the first and second hinge blocks according to forward or rearward movement of the first operating cylinder.

4. The welding device of claim 1, wherein the first operating cylinder is a hydraulic cylinder.

5. The welding device of claim 1, wherein the first operating cylinder is a pneumatic cylinder.

6. The welding device of claim 1, wherein the third connecting link is longer than the second connecting link such that one end portion of the third connecting link is protruded upwardly from the fixed frame, the middle portion of the third connecting link is hinged to the front end portion of the fixed frame, and the one end portion of the third connecting link is protruded upwardly from the fixed frame so as to be hinged to the front end of the operating rod of the second operating cylinder.

7. The welding device of claim 1, wherein the second and third connecting links are rotated with respect to the fixed frame so as to move the connecting block rearward or forward when the second operating cylinder moves forward or rearward.

8. The welding device of claim 1, wherein the welder is mounted so as to be protruded toward the bending die through a mounting block mounted downwardly at the front end portion of the connecting block.

9. The welding device of claim 1, wherein the welder is a one-side arc spot welder.

10. The welding device of claim 1, wherein the second operating cylinder is a hydraulic cylinder.

11. The welding device of claim 1, wherein the second operating cylinder is a pneumatic cylinder.

* * * * *